Patented Oct. 23, 1951

2,572,185

UNITED STATES PATENT OFFICE 2,572,185

COPOLYMERS OF SULFUR DIOXIDE AND STYRENE

Herman D. Noether, Kew Gardens, N. Y., and Ernest Paul Irany, Cranford, N. J., assignors to Celanese Corporation of America, a corporation of Delaware No Drawing. Application January 17, 1947, Serial No. 722,758

7 Claims. (Cl. 260—79.3)

This invention relates to improved synthetic resins and relates more particularly to synthetic resinous compounds comprising copolymers of styrene with sulfur dioxide and containing less than one mol of sulfur dioxide for each mol of styrene in said copolymers.

An important object of this invention is the provision of an improved process for the modification of polystyrene to render the same more resistant to heat and less liable to distortion on exposure to elevated temperatures.

Another object of this invention is the provision of a process for increasing the heat resistance of polystyrene without impairing the molding qualities thereof when it is molded at temperatures which are convenient for commercial operations.

A further object of this invention is the production of heat-resistant modified polystyrene resins of good color and stability, which possess good physical strength and substantially unimpaired dielectric properties.

Other objects of this invention will appear from the following detailed description.

Polymerized styrene of high molecular weight is a widely employed thermoplastic compound and forms molded products of excellent color and clarity which possess good mechanical strength. Styrene may be polymerized by employing heat, ultra-violet light or with the aid of polymerization catalysts such as peroxides, bisulfites, salts of peracids, or sulfur dioxide. When sulfur dioxide is employed as a catalyst for promoting the polymerization of styrene, temperatures above about 85° C. are employed to effect the desired polymerization. The polystyrene obtained is free of combined oxygen and sulfur and is similar to the polystyrene produced when heat, ultra-violet light or other types of catalysts are employed. The polystyrene obtained may be employed for the production of molded products by any of the methods well known in the art. The usefulness of molded products of polystyrene is limited, however, by the fact that they have a relatively low softening temperature and so are not satisfactory for applications involving exposure to temperatures above about 60 to 70° C. for any extended period. Such exposure causes plastic flow and results in undesirable distortion. Many attempts have been made to modify the products obtained on the polymerization of styrene so as to impart greater heat resistance thereto whereby they will be less liable to heat distortion without, however, interfering with or adversely affecting the other valuable properties of said polymers. Up to the present time, no entirely satisfactory solution of this problem has been achieved.

We have now found that if styrene is polymerized at a temperature below 85° C. in the presence of sulfur dioxide, the sulfur dioxide present acts not only as a catalyst for the polymerization reaction, but also takes part in said reaction and true copolymers of styrene and sulfur dioxide are formed. However, the rate of copolymerization is strongly dependent on the concentration of the sulfur dioxide and the temperature of the reaction. Additional catalysts, such as benzoyl peroxide, sulfites, etc., may be employed, but they are unnecessary since the sulfur dioxide, as already stated, acts as a catalyst as well as a monomer in the polymerization. The employment of additional catalysts leads to an acceleration of the reaction without modifying, however, the character of the copolymer formed. The polystyrene-sulfur dioxide copolymers thus formed, by carefully regulating the temperature below the critical ceiling temperature of 85° C. are found not only to retain all the advantageous properties of polystyrene but, in addition, they exhibit a substantially improved resistance to heat and may be exposed to substantially higher temperatures than polystyrene without undergoing any undesirable distortion. The formation of true copolymers of styrene and sulfur dioxide containing less than one mol of sulfur dioxide for each mol of styrene present is quite unexpected in view of the fact that when styrene is polymerized in the presence of sulfur dioxide at temperatures above 85° C. only pure polystyrene is formed and the latter is free of combined oxygen and sulfur.

When temperatures below 85° C. are employed the catalytic activity of sulfur dioxide shows the normal increase with increasing temperatures, but its activity as a component in copolymerization is apparently subject to an abnormal adverse trend of increasing with decreasing temperatures. The rate of polymerization of styrene alone also increases markedly with increasing temperature, but the rate at which sulfur dioxide enters the copolymer decreases steadily. On the other hand, sulfur dioxide itself does not polymerize under any conditions. We have also found that regardless of the amount of sulfur dioxide present in the mixture of styrene and sulfur dioxide which is subjected to polymerizing conditions in accordance with our novel process wherein temperatures below the critical limit of about 85° C. are employed, the sulfur dioxide does not copolymerize in more than equimolar ratio with the styrene.

The novel copolymerization process of our invention may be carried out at temperatures as low as −20° C. and the amount of sulfur dioxide present may range from 0.1% by weight of the styrene present to an excess, the sulfur dioxide even being satisfactorily employed, if desired, as a solvent for the reaction mixture.

The copolymerization may be effected in bulk, in solution, in suspension or in emulsion form by employing suitable emulsifying agents. The most desirable results are obtained by employing copolymerization temperatures of from 20 to 80° C. with the reaction mixture containing from 2 to 25% of sulfur dioxide on the weight of the styrene. Copolymerization products obtained when employing a reaction mixture containing 5 to 10% of sulfur dioxide on the weight of styrene resemble polystyrene very closely with regard to their physical properties except for the fact that they show a notably higher resistance to heat deformation which enables said copolymers to be employed in applications where polystyrene would be entirely unsuitable.

We have found, furthermore, that the composition of the novel sulfur dioxide-styrene copolymers of our invention may be varied with respect to the distribution of styrene and sulfur dioxide units in the copolymer chain by careful control of both the reaction temperature and the concentration of sulfur dioxide to styrene in the reaction mixture. The use of a specific and carefully controlled reaction temperature together with the maintenance of a uniform concentration of sulfur dioxide in the reaction medium produces homogeneous resinous sulfur dioxidestyrene copolymers of a definite chemical composition. The chemical composition and properties of the latter will vary, of course, depending upon the particular reaction temperature employed and the particular sulfur dioxide concentration maintained. Temperature control may be achieved in any convenient manner.

The concentration of sulfur dioxide in the reaction mixture at any given temperature, with respect to the styrene, may be altered, for example, by dissolving the monomeric styrene in an organic liquid which may be either a solvent or nonsolvent for the sulfur dioxide. The change in the effective ratio of sulfur dioxide to styrene, which is achieved in this way, affects the sulfur content of the copolymer formed. Thus, for example, if ligroin is employed as a solvent diluent for the monomeric styrene, the relative concentration of sulfur dioxide to styrene will be reduced since ligroin is not a solvent for the sulfur dioxide. The reduction in the concentration of sulfur dioxide will reduce the sulfur content of the final resinous copolymer obtained even though the reaction temperature employed remains unchanged.

In the case of emulsion polymerization wherein monomeric styrene is emulsified in an aqueous medium and sulfur dioxide is then bubbled through the emulsion, the sulfur dioxide concentration in the reaction medium may be varied by varying the pressure under which the emulsion polymerization takes place. Thus, the copolymerization reaction may be effected under sub-atmospheric or super-atmospheric pressures. The use of sub-atmospheric pressures at any given reaction temperature tends to reduce the concentration of sulfur dioxide in the emulsion while the use of super-atmospheric pressures tends to increase the sulfur dioxide concentration therein. Thus, by suitably varying the pressure, styrene-sulfur dioxide copolymers of different sulfur content may be obtained without increasing or decreasing the reaction temperature.

The novel styrene and sulfur dioxide copolymers of our invention are also distinguished by their higher flow temperatures. It is believed that the increase in heat resistance of said copolymers as compared to polystyrene is due to the presence of the polar sulfone group in the non-polar styrene hydrocarbon structure which enables the latter to form a spatial network of linking forces. The latter, however, are apparently non-permanent linkages for the copolymers are entirely thermoplastic and can be shaped, molded, remolded, extruded, injected or otherwise formed in the various manners well known in the art.

In order further to illustrate our invention, but without being limited thereto, the following examples are given:

Example I 100 parts by weight of freshly distilled styrene are mixed with 10.3 parts by weight of sulfur dioxide, forming a mixture containing 5.15% sulfur on the weight of the styrene and a mol ratio of sulfur dioxide to styrene of 0.17 to 1. The mixture is sealed in glass and copolymerized at room temperature (20° C.) for 12 days under the action of photochemically active light. The copolymer formed under these conditions and obtained after precipitation in methanol, which removes any unreacted monomeric styrene and sulfur dioxide, is a clear, transparent resin. When this resin is molded into discs $\frac{3}{32}$ of an inch thick, the latter are found to soften at 156° C. The molded resin is completely stable even after immersion for three hours in boiling water and neither shrinks nor warps. Ordinary polystyrene however, softens at 112 to 115° C. and looses its shape completely and almost immediately in water at 98° C. The Olsen flow test temperature (A. S. T. M. D569-44T) for the resin is 158° C. while that of polystyrene is 135° C. The sulfur content of the copolymer is found to be 5.1% by weight which is equivalent to a mol ratio of sulfur dioxide to styrene of 0.18 to 1. Thus, it can be seen that copolymers of styrene with sulfur dioxide containing less than one mol equivalent of sulfur dioxide for each mol of styrene in said copolymer can be obtained at room temperature.

The heat distortion or softening test employed to determine the increase in softening temperature obtained by effecting the copolymerization of the sulfur dioxide with styrene is performed in the following manner:

A sample having the dimensions of about 3 inches by 1½ inches and about 0.020 inch in thickness is prepared by compression molding This molded piece is held at one end, immersed to about two thirds of its length in a liquid, e. g., glycerine, which is neither a solvent for, nor absorbed by the sample material, and moved back and forth about four inches through said liquid. The sample is subjected to this test at various temperatures to which the liquid is heated. The temperature at which the sample shows a sharp and easily observable transition from a rigid to a limp condition 5 to 10 seconds after immersion is taken as the heat distortion temperature.

Example II 10 parts by weight of sulfur dioxide are dissolved in 100 parts by weight of styrene, the mixture sealed in glass and polymerized at 50° C. for 8 days without the aid of photochemically active light. Unreacted monomer is removed from the copolymer formed by masticating the reaction product on heated rolls. When molded, the copolymer obtained yields a hard, transparent material having a softening temperature of 153° C. and an Olsen flow test temperature of 156° C. The copolymer contains 4.9% sulfur which is equivalent to a mol ratio of sulfur dioxide to styrene of 0.167 to 1. Thus, at 50° C.

even in the absence of photochemically active light, a copolmer is formed with improved heat resistance.

*Example III*

A mixture of sulfur dioxide and styrene, in the proportions set forth in Example II, is copolymerized in the same manner as in said example but employing a reaction temperature of 60° C. After 8 days, the copolymerization is substantially complete. Unreacted sulfur dioxide is removed on hot rolls. The softening temperature of the copolymer obtained is 138° C. and the latter has an Olsen flow test temperature of 152° C. The sulfur content is 3.8% which is equivalent to a mol ratio of sulfur dioxide to styrene of 0.134 to 1. This copolymerization shows that the use of higher temperatures results in a lower sulfur content in the copolymer, compared with Example II with an accompanying decrease in the improvement of heat resistance.

The addition of 0.25 parts by weight of benzoyl peroxide to the mixture followed by copolymerization at 60° C. does not increase the sulfur content of the copolymerized resin obtained.

*Example IV*

A solution of 5 parts by weight of sulfur dioxide in 100 parts by weight of styrene is copolymerized for about three weeks at 50° C. A hard, transparent resin having a softening or flow temperature of 130° C. and an Olsen flow test temperature of 146° C. is obtained, in about 95% yield. The sulfur content of the resin is 2.5%, which is equivalent to a mol ratio of sulfur dioxide to styrene of 0.086 to 1.

*Example V*

A mixture of 25 parts by weight of styrene and 100 parts by weight of water is brought up to a temperature of 31° C. in a thermostat, under stirring, and nitrogen is passed through the system while the mixture is maintained at said temperature. A slow stream of sulfur dioxide is then passed through the suspension for about 7 hours. The excess sulfur dioxide is swept out of the reaction mixture with a stream of nitrogen or is neutralized with alkali. The product, which comprises a mixture of styrene monomer and styrene-sulfur dioxide copolymer, is dissolved in dioxane, reprecipitated in methanol and dried. The resin obtained contains 9.81% of sulfur which is equivalent to a mol ratio of sulfur dioxide to styrene of 0.397 to 1.

When the copolymerization is effected in the same manner but at a temperature of 71.5° C., the resin copolymer produced is found to contain 2.92% of sulfur which is equivalent to a mol ratio of sulfur dioxide to styrene of 0.101 to 1. When employing a temperature of 81° C. for the copolymerization, the copolymer produced contains only 0.51% of sulfur or a mol ratio of sulfur dioxide to styrene of 0.016 to 1. This example shows that even in the case of a dispersion or aqueous suspension the amount of sulfur dioxide entering into the copolymerization reaction is dependent on the temperature employed, decreasing linearly as the temperature increases.

*Example VI*

A mixture of 100 parts by weight of styrene and 5 parts by weight of sulfur dioxide is emulsified in 150 parts by weight of water containing 1.6 parts by weight of the sodium sulfonate of isopropyl naphthalene, known commercially as "Aerosol OS," and 0.5 part by weight of another surface-active agent comprising a sodium salt of a sulfonated hydrocarbon known commercially as "Sulfatate." A portion of the emulsified mixture obtained is agitated for about 20 hours at each of the following temperatures and copolymers containing sulfur in the given amounts are obtained:

| Reaction Temperature | Sulfur Content of the Resin (per cent by weight) | Per Cent Yield | Per Cent Sulfur Dioxide Consumed | Mol Ratio Sulfur Dioxide to Styrene |
|---|---|---|---|---|
| 30° C | 9.05 | 28 | 100 | 0.360 to 1. |
| 40° C | 6.38 | 32 | 82 | 0.238 to 1. |
| 50° C | 5.57 | 37 | 85 | 0.204 to 1. |
| 60° C | 3.70 | 45 | 67 | 0.13 to 1. |

This example shows that similar results as in the preceding example, can be obtained using emulsions in place of dispersions.

*Example VII*

100 parts by weight of styrene are dissolved in 500 parts by weight of liquefied sulfur dioxide and the mixture refluxed at atmospheric pressure in a constant temperature bath kept at −3 to 0° C. Oxygen is bubbled through the solution for about 1 hour and after refluxing for about three hours the sulfur dioxide solution is poured into methanol. A white resin is precipitated and is washed free of monomer with methanol. The sulfur content of the resin is 16.81% corresponding to a molar ratio of sulfur dioxide to styrene of 0.823:1. It is thus seen that at low temperatures using sulfur dioxide in excess as a solvent, the sulfur content is appreciably increased, although the ratio of sulfur dioxide to styrene in the copolymer remains less than one.

*Example VIII*

A series of mixtures consisting of 100 parts by weight of styrene and five parts by weight of sulfur dioxide are emulsified as described in Example VI. To each of two of the mixtures, as indicated below, is added 1 part by weight of sodium meta-bisulfite ($Na_2S_2O_5$), to two others are added 1.6 parts by weight of sodium sulfite ($Na_2SO_3$) while the other mixtures are reacted without any additional catalyst. The emulsions are shaken in a constant temperature bath at 30° C. in sealed tubes for various lengths of time after which they are removed and analyzed for yield of copolymer and sulfur content. The following results are obtained:

| Mixture | Additional Catalyst | Time of reaction in hours | Per Cent Yield | Per Cent $SO_2$ Consumed | Per Cent Sulfur in Copolymers |
|---|---|---|---|---|---|
| 1 | none | 6.5 | 15 | 58 | 9.70 |
| 2 | none | 23 | 32 | 99 | 7.60 |
| 3 | $Na_2S_2O_5$ | 3 | 15 | 59 | 9.91 |
| 4 | do | 6.5 | 23 | 85 | 9.24 |
| 5 | $Na_2SO_3$ | 3 | 19 | 71 | 9.33 |
| 6 | do | 6.5 | 27 | 88 | 8.11 |

It is apparent from the above figures that with or without additional catalysts of various types the sulfur content of the product diminishes as the reaction proceeds, indicating that the sulfur dioxide enters into the copolymer faster than the styrene component. This non-uniformity of reaction rate affects the homogeneity of the resultant material.

Example IX 130 parts by weight of styrene are emulsified in 260 parts by weight of water containing 3.25 parts by weight of "Aerosol OS" (sodium sulfonate of isopropyl naphthalene) and 0.6 part by weight of another surface-active agent comprising "Sulfatate" (a sulfonated hydrocarbon). This emulsion is brought to the desired reaction temperature in an atmosphere of nitrogen. When the reaction temperature is reached, sulfur dioxide is passed through the emulsion in a continuous stream to keep the system saturated with sulfur dioxide. The reaction temperature is maintained at 64° C. ±1°. Saturation is achieved in about five to ten minutes after which additional catalysts, for example, potassium persulfate and promoting substances as, for example, ferric chloride may be added to the emulsion to speed up the copolymerization, while keeping the temperature constant. 0.15 part by weight of potassium persulfate is now added in three increments of 0.05 part by weight each with 0.004 part of ferric chloride being added as a promoting agent with the first fraction of the persulfate. Samples are removed during various stages of the reaction and yields and sulfur content determined. The following results are obtained:

| Time of Reaction in Minutes | Per Cent Yield | Per Cent By weight of Sulfur in Resin |
|---|---|---|
| 19 | 48 | 5.29 |
| 69 | 91 | 5.49 |
| 119 | 93 | 5.45 |
| 176 | 100 | 5.33 |

Thus, by maintaining the temperatures and the sulfur dioxide concentration in the reaction medium constant, the rate of reaction and uniformity may be closely controlled so that the product formed is of a substantially homogeneous composition as shown by the sulfur content at the different stages of the reaction.

When the copolymerization is conducted in the same manner as above but at a different temperature, the following compositions of uniform character are obtained:

| Temperature | Per Cent By Weight of Sulfur in Resin |
|---|---|
| 52° C | 9.2 |
| 55° C | 8.5 |
| 64° C | 5.3 |
| 70° C | 3.6 |
| 76° C | 1.7 |

Example X

An emulsion of the composition as described under Example IX is polymerized at 52° C. under reduced pressure, i. e., 390° mm. of mercury, with potassium persulfate as a catalyst, while maintaining saturation at this temperature with a stream of sulfur dioxide. After three hours a good yield of the polymer is obtained, showing on analysis a sulfur content of 4.9% in contrast to 9.2% when the experiment is performed at atmospheric pressure as in Example IX.

Our novel copolymers are true copolymers of styrene with sulfur dioxide since careful investigation has shown that the said copolymers contain carbon and hydrogen substantially in the same proportion as in styrene, and sulfur and oxygen substantially in the same proportion as in sulfur dioxide.

It is to be understood that the foregoing detailed description is given merely by way of illustration and that many variations may be made therein without departing from the spirit of our invention.

Having described our invention, what we desire to secure by Letters Patent is:

1. Process for the production of copolymers, which comprises copolymerizing sulfur dioxide with styrene in a reaction medium where the styrene and sulfur dioxide are the sole materials present employing a copolymerization temperature below 85° C.

2. Process for the production of copolymers, which comprises copolymerizing sulfur dioxide with styrene in a reaction medium where the styrene and sulfur dioxide are the sole materials present employing a substantially constant copolymerization temperature below 85° C.

3. Process for the production of copolymers, which comprises copolymerizing sulfur dioxide with styrene in a reaction medium where the styrene and sulfur dioxide are the sole materials present employing a copolymerization temperature below 85° C. while maintaining the concentration of sulfur dioxide in the reaction medium substantially constant.

4. Process for the production of copolymers, which comprises copolymerizing sulfur dioxide with styrene under subatmospheric pressure in a reaction medium where the styrene and sulfur dioxide are the sole materials present employing a copolymerization temperature below 85° C.

5. Process for the production of copolymers, which comprises copolymerizing sulfur dioxide with styrene under superatmospheric pressure in a reaction medium where the styrene and sulfur dioxide are the sole materials present employing a copolymerization temperature below 85° C.

6. Process for the production of copolymers, which comprises copolymerizing sulfur dioxide with styrene under subatmospheric pressure in a reaction medium where the styrene and sulfur dioxide are the sole materials present employing a copolymerization temperature below 85° C. while maintaining the concentration of sulfur dioxide in the reaction medium substantially constant.

7. Process for the production of copolymers, which comprises copolymerizing sulfur dioxide with styrene under superatmospheric pressure in a reaction medium wher the styrene and sulfur dioxide are the sole materials present employing a copolymerization temperature below 85° C. while maintaining the concentration of sulfur dioxide in the reaction medium substantially constant.

HERMAN D. NOETHER.
ERNEST PAUL IRANY.

REFERENCES CITED

The following references are of record in the file of this patent:

UNITED STATES PATENTS

| Number | Name | Date |
|---|---|---|
| 2,137,393 | Dorough | Nov. 22, 1938 |
| 2,241,900 | Brubaker | May 13, 1941 |
| 2,462,354 | Brubaker et al. | Feb. 22, 1949 |

OTHER REFERENCES

Glavis et al., J. Am. Chem. Soc., 59, 707–11 (1937).